US006460629B2

(12) United States Patent
Bookshar et al.

(10) Patent No.: US 6,460,629 B2

(45) Date of Patent: Oct. 8, 2002

(54) PNEUMATIC TOOL AND SYSTEM FOR APPLYING TORQUE TO FASTENERS

(75) Inventors: Duane R. Bookshar, Highland Heights; James F Steverding, Mentor; Michael Juliano, Mayfield Hts, all of OH (US)

(73) Assignee: The Stanley Works, New Britain, CT (US)

( * ) Notice: Subject to any disclaimer, the term of this patent is extended or adjusted under 35 U.S.C. 154(b) by 0 days.

(21) Appl. No.: 09/987,481

(22) Filed: Nov. 14, 2001

(65) Prior Publication Data

US 2002/0056557 A1 May 16, 2002

Related U.S. Application Data

(60) Provisional application No. 60/248,220, filed on Nov. 15, 2000.

(51) Int. Cl.[7] .......................... B23Q 5/00; B25B 23/14

(52) U.S. Cl. .......................... 173/176; 173/2; 173/181

(58) Field of Search .............................. 173/176, 178, 173/2, 177, 180, 181, 182; 81/470, 467, 474; 73/862.23, 862.21

(56) References Cited

U.S. PATENT DOCUMENTS

| | | | | | |
|---|---|---|---|---|---|
| 4,294,110 | A | | 10/1981 | Whitehouse | |
| 4,375,121 | A | * | 3/1983 | Sigmund | 173/176 |
| 4,434,858 | A | | 3/1984 | Whitehouse | |
| 4,903,783 | A | | 2/1990 | Rushanan et al. | |
| 4,991,663 | A | | 2/1991 | Steverding | |
| 5,062,491 | A | * | 11/1991 | Takeshima et al. | 173/181 |
| 5,154,242 | A | * | 10/1992 | Soshin et al. | 173/178 |
| 5,284,217 | A | * | 2/1994 | Eshghy | 173/176 |
| 5,315,501 | A | * | 5/1994 | Whitehouse | 73/862.23 |
| 5,505,676 | A | | 4/1996 | Bookshar | |
| 5,636,698 | A | * | 6/1997 | Estep et al. | 173/2 |
| 5,898,379 | A | | 4/1999 | Vanbergeijk | |

* cited by examiner

*Primary Examiner*—Scott A. Smith

(74) *Attorney, Agent, or Firm*—Pillsbury Winthrop LLP

(57) ABSTRACT

The present application relates to a pneumatic tool for applying torque to fasteners and a system incorporating such a tool.

4 Claims, 10 Drawing Sheets

| BENDIX CONN PIN | CABLE WIRE COLOR | FUNCTION | CABLE 144 WIRE COLOR | | CABLE 146 WIRE COLOR |
|---|---|---|---|---|---|
| A | RED | | RED | | |
| B | BLACK | Common | BLACK | | |
| C | WHITE | Run Signal | WHITE | | |
| D | GREEN | Shut off Signal | GREEN | | |
| E | SHEILD | | | | |
| F | BLUE | | | | |
| G | WHITE/BLUE | | | | |
| H | ORANGE | | | | |
| J | WHITE/ORANGE | | | | |
| K | WHITE/VIOLET | | | | |
| L | WHITE/GREEN | | | | |
| M | WHITE/YELLOW | L.E.D. YELLOW | | | WHITE |
| N | WHITE/BROWN | L.E.D. GREEN | | | GREEN |
| P | BROWN | | | | |
| R | YELLOW | | | | |
| S | VIOLET | | | | |
| T | GRAY | | | | |
| U | WHITE/RED | L.E.D. RED | | | RED |
| V | WHITE/BLACK | L.E.D. COMMON | | | BLACK |

FIG. 8

PNEUMATIC TOOL AND SYSTEM FOR APPLYING TORQUE TO FASTENERS

The present cation claims priority to U.S. Provisional Application of Bookshar et al., Serial No. 60/248,220 filed Nov. 15, 2000 the entirety of which is hereby incorporated into the present application by reference.

FIELD OF THE INVENTION

The present application relates to a pneumatic tool for applying torque to fasteners and a system incorporating such a tool.

BACKGROUND AND SUMMARY OF THE INVENTION

The use of pneumatic tools, such nutrunners and torque wrenches, for tightening fasteners is well-known in the art. In some systems, these tools are communicated to a processor that monitors the operating condition of the tool to determine whether the tool has properly completed a fastening job. Specifically, the processor determines whether the fastener has been tightened to a pre-set amount of torque. If the processor determines that the tool has not properly completed a fastening job, then the processor generates a visual or audible signal to the user indicating that the job was not completed. Also, the processor may log the event along with vehicle identification information into a computer readable memory (either in the processor itself or at a remote location) so that the inspection and full tightening of the incompleted fastener can be accomplished at a later time.

In one conventional arrangement, one end of a length of pneumatic tubing is communicated to the interior of the tool. The opposite end of the tubing is communicated to a transducer located inside the processor. As pressures vary inside the tool, these pressure variations are transmitted to the transducer via the pneumatic tubing. The transducer in turn converts these pressure variations into electric signals, which the processor processes to accomplish monitoring of the tool performance. This conventional arrangement suffers from two significant drawbacks. First, the tubing must be sufficiently long to enable the user to maneuver while using the tool. As a result of using a long length of tubing, the system will lose its signal integrity. Specifically, the signal's timing will be delayed because the signal must travel along the air within the tubing. Also, the signal will lose some of its strength because the air in the tubing is compressible. Second, the system will not function if the user steps on the tubing or the tubing becomes severely kinked because the pressure variations will not be effectively communicated to the processor's transducer.

U.S. Pat. No. 5,898,379 to Vanbergeijk, issued Apr. 27, 1999 (the '379 patent) discloses a system that allows for monitoring of the tool performance without the use of the pneumatic tubing. The tool disclosed in the '379 patent has a pair of pressure sensors and an on-board wireless transmitter that transmits a signal to a remote wireless receiver within the processor. A significant drawback of the subject matter disclosed in the '379 patent is that it fails to disclose an adequate sensing mechanism for sensing pressure variations within the tool. Specifically, the '379 patent discloses pneumatic pressure valves or switch contacts connected to moving mechanical components as being options for the pressure sensors. The interior of a pneumatic tool, however, is usually lubricated with oil or some other lubricant to improve performance and increase its operational longevity. The use of lubricant can interfere with the operation of either of the pressure sensing mechanisms disclosed in the '379 patent. For example, dirt or particles within the oil can build up on the pneumatic pressure valve, thus interfering with its performance. Likewise, lubricant present on the contacts of the switches can interfere with the proper operation of the switch. Specifically, the lubricant can interrupt the contact between the switch contacts, thus preventing the processor from determining that the switch is closed.

Consequently, there exists a need in the art for a pneumatic tool and system that has an improved pressure sensing system that is able to operate effectively in the presence of lubricants that are present within the tool.

To meet the foregoing need, one aspect of the present invention provides a pneumatically drivable tool for applying torque to fasteners in conjunction with (i) a processor that monitor the state changes of first and second switches on the tool during the performance of a fastening job and to compare the state changes to pre-selected parameters to determine a status of the fastening job and (ii) a supply of pressurized gas. The tool comprises a housing having a fluid path provided therein. The fluid path has an inlet end connectable to a supply of pressurized gas and an outlet end for exhausting the pressurized gas from the housing. A rotatable fastener engaging member is constructed and arranged to be engaged with a fastener in a torque transmitting relation wherein rotation of the fastener engaging member applies torque to the fastener to affect rotation of the fastener. A pneumatically drivable motor is positioned within the fluid path between the inlet and outlet ends. The motor is constructed and arranged such that the pressurized gas flowing through the fluid path flows through the motor to generate rotational power. The motor is operatively connected with the fastener engaging member such that the motor rotates the fastener engaging member using power generated by the pressurized gas flowing therethrough.

An actuator valve is positioned within the fluid path between the inlet port and the motor. The actuator valve is movable between an open position enabling the pressurized gas to flow through the path and a closed position preventing the pressurized gas from flowing through the path. An actuator is constructed and arranged to be manually operated by a user of the tool. The actuator is connected to the actuator valve such that operation thereof by the user moves the actuator valve between the closed and open positions thereof. A shut-off valve is positioned within the fluid path between the actuator valve and the motor and moves between an open position enabling the pressurized gas to flow through the path and a closed position preventing the pressurized gas from flowing through the path. A shut-off mechanism is coupled to the shut-off valve and provides for movement of the shut-off valve from the open position thereof to the closed position thereof responsive to the torsional resistance being offered by a fastener during rotation thereof reaching a predetermined level. A first switch having a plurality of states is adapted to be communicated with the processor to enable the processor to monitor states changes of the first switch. The first switch changes from a first of the states to a second of the states responsive to the pressurized gas flowing into a portion of the fluid path between the shut-off and actuator valves as a result of the actuator valve being in the open position thereof. A second switch having a plurality of states is adapted to be communicated with the processor to enable the processor to monitor states changes of the second switch. The second switch changes from a first of the states to a second of the states responsive to the pressurized gas flowing into a portion of the fluid path between the shut-off valve and the motor as a result of both the shut-off and actuator valves being in the open positions thereof.

Fluidly sealed casing structure encasing the first and second switches to protect the switches from any lubricant present within the housing. The use of the fluidly sealed casing structure enables the switches to function without interference from the lubricant in the tool. Preferably, the switches have their own casing; but alternatively they may both be encased in a fluid casing structure.

A related aspect of the invention provides a system incorporating the above-described tool.

Another drawback with conventional arrangements wherein pneumatic tubing is communicated between the tool and the processor is that the signaling device responsible for signaling the user that the job has not been properly completed is located on the processor. Typically, the signaling device is in the form of a flashing or steady state light. The user of the tool must look to the processor after completing each and every fastening job in order to verify that he/she has completed the fastening job properly. In the event the user fails to look at the processor after disengaging the tool from a fastener, then the job may pass through incompleted, thus requiring another worker to locate the uncompleted fastener and tighten the same to complete the job. Thus, there exists a need for an improved system wherein the signaling device is better located to draw attention by the user of the tool.

In order to meet the above-described need, another aspect of the invention provides, a pneumatically drivable tool for applying torque to fasteners in conjunction with (i) a processor that monitor the state changes of first and second switches on the tool during the performance of a fastening job and to compare the state changes to pre-selected parameters to determine whether the user has performed the fastening job in accordance with the parameters and (ii) a supply of pressurized gas. The processor is operable to generate and transmit a signal based on the comparison of the state changes. The tool comprises a housing having a fluid path provided therein. The fluid path has an inlet end connectable to a supply of pressurized gas and an outlet end for exhausting the pressurized gas from the housing. A rotatable fastener engaging member is constructed and arranged to be engaged with a fastener in a torque transmitting relation wherein rotation of the fastener engaging member applies torque to the fastener to affect rotation of the fastener. A pneumatically drivable motor is positioned within the fluid path between the inlet and outlet ends. The motor is constructed and arranged such that the pressurized gas flowing through the fluid path flows through the motor to generate rotational power. The motor is operatively connected with the fastener engaging member such that the motor rotates the fastener engaging member using rotational power generated by the pressurized gas flowing therethrough.

An actuator valve is positioned within the fluid path between the inlet end and the motor. The actuator valve is movable between an open position enabling the pressurized gas to flow through the path and a closed position preventing the pressurized gas from flowing through the path. An actuator is constructed and arranged to be manually operated by a user of the tool and is connected to the actuator valve such that operation thereof by the user moves the actuator valve between the closed and open positions thereof. A shut-off valve is positioned within the fluid path between the actuator valve and the motor. The shut-off valve is movable between an open position enabling the pressurized gas to flow through the path and a closed position preventing the pressurized gas from flowing through the path. A shut-off mechanism is coupled to the shut-off valve and provides for movement of the shut-off valve from the open position thereof to the closed position thereof responsive to the torsional resistance being offered by a fastener during rotation thereof reaching a predetermined level. A first switch having a plurality of states is adapted to be communicated with the processor to enable the processor to monitor states changes of the first switch. The first switch changes from a first of the states to a second of the states responsive to the pressurized gas flowing into a portion of the fluid path between the shut-off and actuator valves as a result of the actuator valve being in the open position thereof.

A second switch having a plurality of states is adapted to be communicated with the processor to enable the processor to monitor states changes of the second switch. The second switch changes from a first of the states to a second of the states responsive to the pressurized gas flowing into a portion of the fluid path between the shut-off valve and the motor as a result of both the shut-off and actuator valves being in the open positions thereof. An on-board signaling device is carried on the housing and adapted to be communicated with the processor. The signaling device generates a user verifiable fastening job signal to be received by the user of the tool that indicates a status of a fastening job responsive to receiving the aforesaid signal from said processor.

A related aspect of the invention provides a system incorporating the above-described tool.

Other objects, features, and advantages will become apparent from the following description, the accompanying drawings, and the appended claims.

BRIEF DESCRIPTION OF THE DRAWINGS

FIG. 8 is a chart illustrating the groupings of the individual connections within the bundle and the respective functions of these connections;

DETAILED DESCRIPTION OF THE ILLUSTRATED EMBODIMENTS OF THE INVENTION

Figure 1:
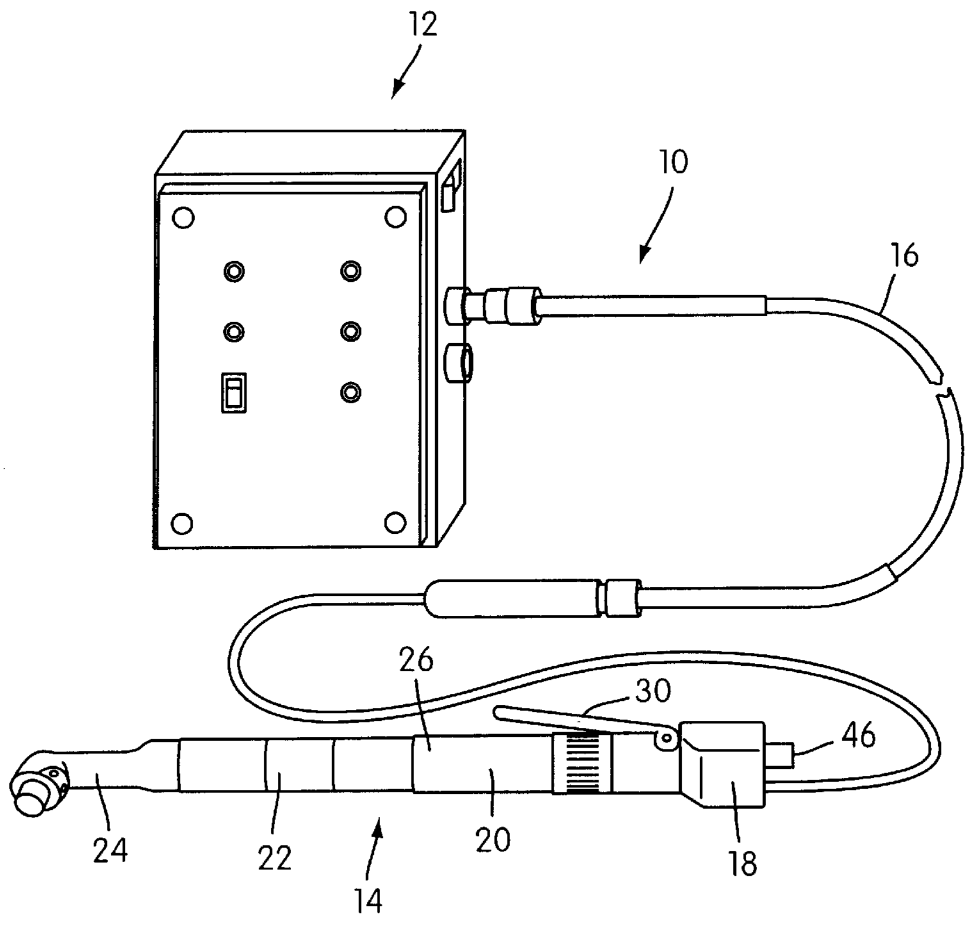
FIG. 1 is a perspective view illustrating a system constructed in accordance with the principles of the present invention.

FIG. 1 shows a system for applying torque to fasteners. The system is generally indicated at 10 and comprises a freestanding control box, generally indicated at 12 and housing a processor in the form of programmable logic controller (PLC); a pneumatically drivable tool, generally indicated at 14; and an electric cable bundle, generally indicated at 16 and extending between the control box 12 and the tool 14.

Figure 2:
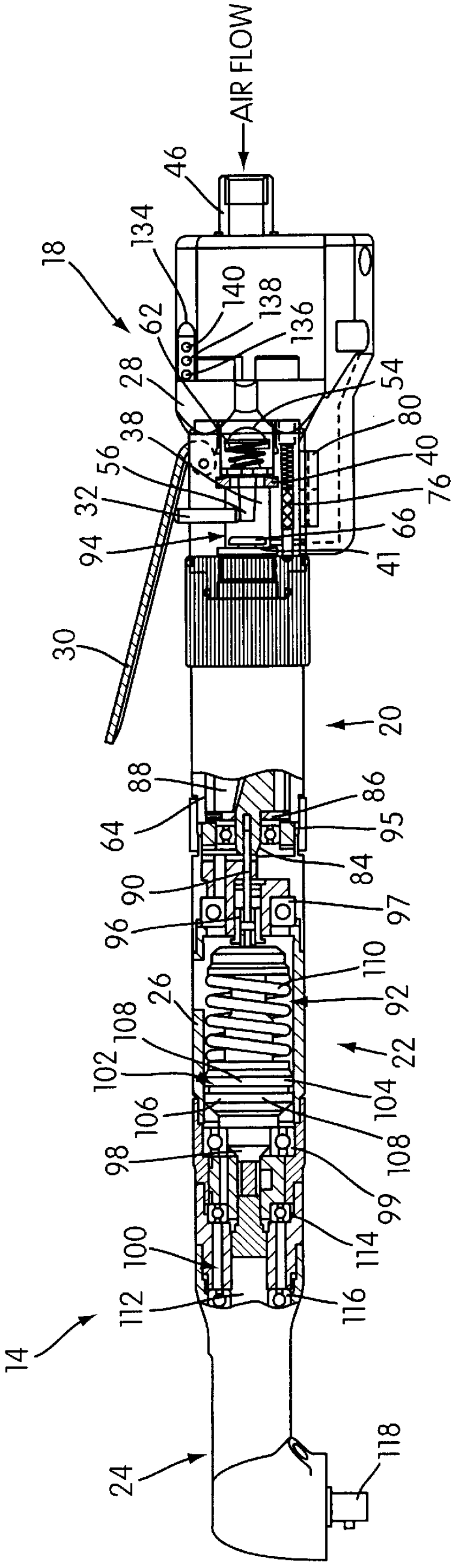
FIG. 2 is a cross-sectional view of a pneumatically drivable tool used in the system of FIG. 1, the cross-section being taken along the longitudinal centerline thereof.

FIG. 2 is a cross-sectional view of the tool 14 taken along the longitudinal centerline thereof. The tool 14 is constructed in a modular manner and comprises four primary sections including a valve control section 18; a motor section 20; a shut-off mechanism section 22; and a right-angle transmission section 24. The tool 14 has an outer housing 26 comprised of the individual outer shells of each of these sections. Alternatively, the tool 14 may be constructed in a non-modular manner using a single housing with all the components of the tool arranged and interconnected within that single housing.

Figure 3:
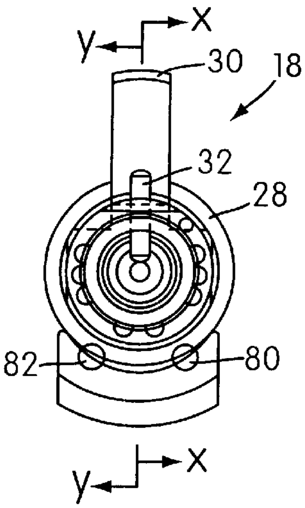
FIG. 3 is a front end view of a valve control section removed and isolated from the tool of FIG. 2.
Figure 4:
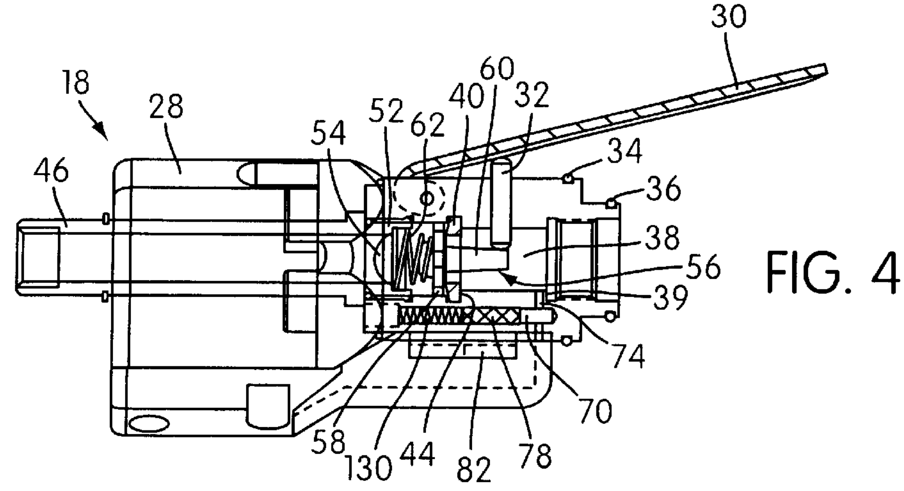
FIG. 4 is a cross-sectional view taken along line X—X of FIG. 3.
Figure 5:
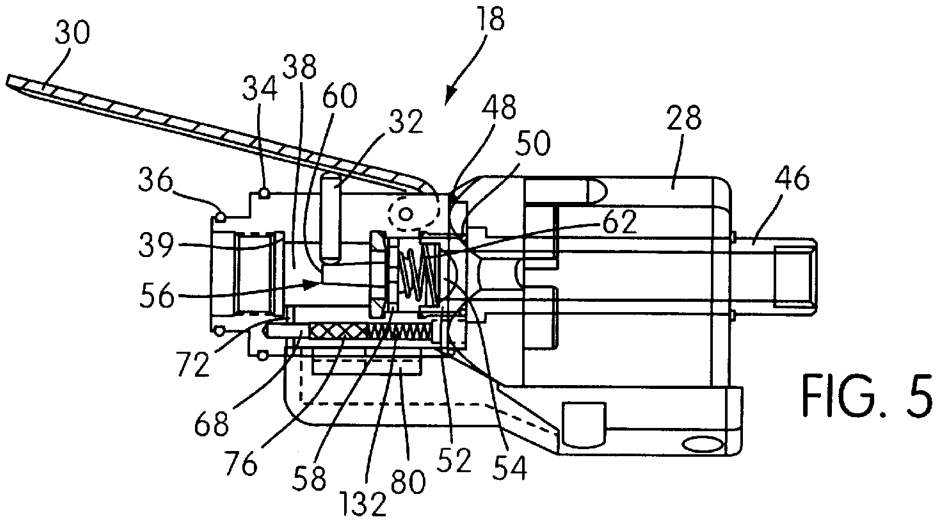
FIG. 5 is a cross-sectional view taken along line Y—Y of FIG. 3.

The valve control section 18 is best illustrated in FIGS. 3–5. The valve control section 18 has a main body 28 with an actuator constituted by a lever 30 pivotally mounted to the main body 28. A plunger 32 is mounted for reciprocating rectilinear movement within a radial bore in the main body 28. The forward end of the main body 28 has a necked-down portion configured for receipt in a rear end opening of the motor section 20. A pair of O-rings 34, 36 provide seals between the exterior of the main body 28 and the interior of the open rear end portion of the motor section 20. The forward end portion of main body has a longitudinal bore 38 formed through the interior thereof. The interior of the bore 38 has a forwardly facing surface 39 which the shut-off valve seat structure 41 engages in sealed relation when the valve control section 18 is coupled to the motor section 20. This sealed relation prevents pressurized air from circumventing the closed shut-off valve 66 by flowing between the surface 39 and the valve seat structure 41. An annular valve seat ring 40 is positioned within the bore 38 and provides a surface constituting an actuator valve seat 42. The ring 40 is received within an annular groove 44 formed on the interior of the bore 38.

A tubular conduit 46 has a forward end portion thereof connected to and communicated with the bore 38. A pair of O-rings 48, 50 provide a seal between the main body 28 and the tubular conduit 46. The rear end portion of the conduit 46 extends rearwardly from the tool 14. This rear end portion is constructed and arranged to be releaseably connected with the free end of a pneumatic gas supply hose (not shown) which is connected to a supply of pressurized gas (not shown), which will normally be air. This enables the pressurized air to flow into the conduit 46.

The rear end of the bore 38 has an annular dust screen mounting ring 52 mounted therein. A dome-shaped dust screen 54 mounts within the ring 52 and prevents particles in the pressurized gas flowing through the conduit 46 from flowing into the bore 38.

An actuator valve 56 mounts within the opening provided in the ring 40. The valve 56 has a generally circular sealing disc 58 and a valve stem 60 extending forwardly from the disc 58. The valve 56 is arranged with the disc 58 positioned rearwardly of the ring 40 adjacent the valve seat 42 and the stem 60 extending forwardly through the opening in ring 40 to a position adjacent the plunger 32. A coil spring 62 has one end engaged with the disc 58 and another end engaged with the dust screen mounting ring 52. The spring 62 biases the valve 56 to a closed position with the disc 58 in sealing engagement against the valve seat 42 provided by the ring 40. The pressurized air flowing against the rear surface of the disc 58 also assists in maintaining the valve 56 in its closed position with the disc 58 in its sealed engagement against the valve seat 42.

Manually depressing the lever 30 towards the main body 28 pushes the plunger 32 radially inwardly into the bore 38 The inward movement of the plunger 32 moves the valve 56 to its open position by moving the valve stem 60 in a tilting manner so that a portion of the disc 58 is unseated from the valve seat 42. In this open position, the pressurized air is allowed to flow past the unseated valve disc 58 and through the opening in the ring 40. As will be described in more detail later in the application, this pressurized air thereafter flows through the motor 64 to power the tool 14 and exhausts from the housing 26 (assuming that the shut-off valve 66, which will be described in further detail, is in its open position).

The motor 64 may have any suitable construction for being powered by the flow of pressurized gas. The motor 64 in the illustrated embodiment has a rotatable shaft 84 with a longitudinal bore 86 formed therethrough and a plurality of vanes 88 extending radially from the shaft 84. As will be described in further detail below, an actuating rod 90 extends rearwardly from the shut-off mechanism 92 to the shut-off valve 66 to enable the mechanism 92 to affect movement of the valve 66 between its open and closed positions. The path along which the pressurized gas flows during operation of the tool 14 may be considered a fluid path that includes the conduit 46 and the bore 38 and that has the motor 64 positioned therein. The inlet end of the fluid path is provided at the rear end opening of conduit 46, and an outlet end (not shown) opens to the exterior of the housing 26 to enable pressurized gas to exhaust from the housing after having passed through the motor 64 and driven the vanes 88 thereof. The outlet end can have any configuration and may be provided by a single port, a plurality of ports, a gap between housing components, or any other conceivable opening that enables the pressurized gas to exhaust from the housing so as to provide for continuous flow of the gas through the fluid path. The fluid path is generally indicated at 94.

The forward end of the shaft 84 is rotatably supported by a ball bearing assembly 95 and extends forwardly to the shut-off mechanism section 22. The rearwardly extending shank 96 of the shut-off mechanism 92 fixedly connects to the motor shaft 84 and rotates therewith. A ball bearing assembly 97 rotatably supports the shank 96. The shut-off mechanism 92 has an output spindle 98 at the forward end thereof that connects to the right angle transmission, generally indicated at 100. A ball bearing assembly 99 rotatably supports the output spindle 98. A clutch mechanism 102 interconnects the shank 96 with the output spindle 98. The clutch mechanism 102 comprises a pair of complementary races 104, 106 with a plurality of cam lobes 108 on their facing surfaces and a plurality of rolling balls (not shown) positioned between the races 104, 106. A coil spring 110 biases the races 104, 106 towards one another so that the driving force of the motor 64 is transmitted from race 104 to race 106 via the engagement between the balls and the lobes 108. Race 106 is fixedly connected to the output spindle 98 and thus the motor driven rotation of the race 106 affects rotation of the spindle 98.

In the illustrated embodiment, the shut-off mechanism 92 has a construction identical to that disclosed in U.S. Pat. No.

5,505,676 issued to Bookshar, the first named inventor of the present application, and assigned to The Stanley Works, the assignee of the present application. The '676 patent is hereby incorporated into the present application by reference in its entirety. The shut-off mechanism 42 is constructed and arranged to move the actuating rod 90 in a forward direction responsive to the torsional resistance being offered by a fastener being tightened by the tool reaching a predetermined level. This rod movement in turn moves the shut-off valve 66 forwardly from the open position thereof to the closed position thereof. This predetermined level can be manually adjusted by selectively operating an adjusting mechanism (not shown) that adjusts the tension of the spring 110. In its open position, the shut-off valve 66 is displaced rearwardly out of engagement with the valve seat structure 41 so as to enable the pressurized air flowing past the open actuator valve 56 to flow through the valve seat structure 41 and into the motor 64 for powering the tool 14. In its closed position, the shut-off valve 66 is engaged in sealed relation with the valve seat structure 41 so as to prevent any pressurized gas from flowing through the valve seat structure 41 and into the motor 64. The shut-off valve 66 and the shut-off mechanism 92 may have any suitable construction as long as the valve 66 is moved from its open position wherein it enables pressurized gas to flow through the tool's fluid path to its closed position wherein it prevents pressurized gas from flowing through the fluid path in response to the torsional resistance of the fastener reaching a predetermined level. For example, the shut-off mechanism disclosed in U.S. Appln. of Borries et al., Ser. No. 09/562,958 may be used. The Borries '958 application is hereby incorporated into the present application in its entirety.

The right angle transmission section 24 houses the right angle transmission 100. The output spindle 98 of the shut-off mechanism 92 is connected to an input spindle 112 of the right-hand transmission 100 so that rotation of spindle 98 rotatably drives spindle 112. The input spindle 112 is rotatably supported by a pair of ball bearing assemblies 114, 116. A tool output spindle 118 extends outwardly from the transmission section 24 at a perpendicular angle with respect to the extent of the input spindle 112. The tool output spindle 118 is configured to receive and releasably retain thereon a fastener engaging member in the form of a conventional fastener engaging socket (not shown) which can be removably coupled with a fastener in torque transmitting relation. The output spindle 118 is connected in driving relation to the input spindle 112 by a bevel gear transmission (not shown) housed within the transmission section 24.

The main body 28 of the valve control section 18 also has a spaced apart pair of bores 68, 70 each of which are communicated to bore 38 by radially extending bores 72, 74, respectively. Bore 72 opens to a portion of the bore 38 that is located between the shut-off valve 66 and the actuator valve 56 (i.e., upstream of the shut-off valve 66, but downstream of the actuator valve 56). Bore 74 opens to a portion of the bore 38 that is located between the shut-off valve 66 and the motor 64 (i.e., upstream of the motor 64, but downstream of the shut-off valve 66). A cylindrical member 76 of magnetized material is slidably received in bore 68 and a cylindrical member 78 of magnetized material is slidably received in bore 70 First and second magnetically actuated reed switches 80, 82, respectively, are mounted in the valve control section 18 adjacent the bores 68, 70, respectively. Each of these switches 80, 82 is of the two-pole type with two distinct states—on and off.

Figure 2A:
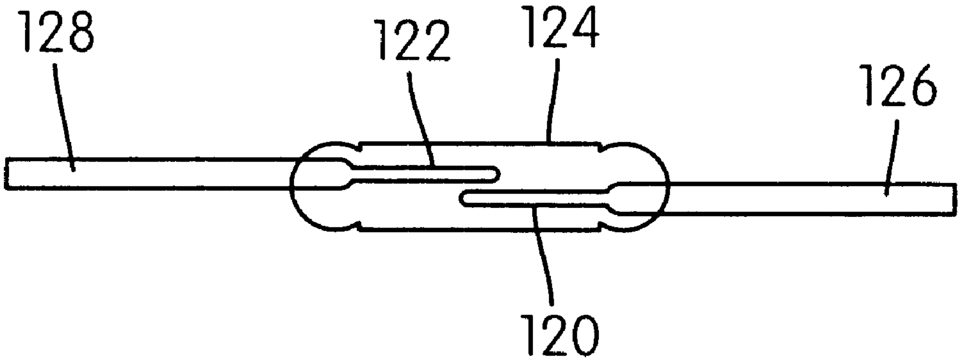
FIG. 2A is a cross-sectional view of a switch used in the tool of FIG. 1.

FIG. 2A discloses a cross-section of switch 80. Switch 82 has an identical construction. The switch 80 comprises a stationary contact element 120 and a movable switching element 122. A fluidly sealed casing structure 124 in the form of a molded plastic housing surrounds and encases the switch and contact elements 120, 122 so as to prevent any lubricants in the tool from entering the switch 80 and interfering with the electroconductive contact between the elements 120, 122. Connecting element 126 extends into the fluidly sealed casing structure 124 and functions as a lead to communicate the contact element 120 to the PLC via an individual wire in the cable bundle 16. Connecting element 128 extends into the fluidly sealed casing structure 124 and functions as a lead to communicate the switching element 122 to the PLC via an individual wire in the cable bundle 16. The interface between the connecting elements 126, 128 and the casing structure 124 is sealed to prevent the ingress of any lubricant. For reasons which will become appreciated below, the contact element 120 is made of a non-ferric/magnetic electroconductive material and switching element 122 is made of a ferric electroconductive material.

When the switching element 122 contacts the contact element 120, a closed circuit is created and the switch 80 is in its on state. The closed condition of the circuit is detected by the PLC via the wires in the cable bundle 16 as a state change from the off state to the on state. When the switching element 122 contacts the contact element 120, a closed circuit is created and the switch 80 is in its on state. The closed condition of the circuit is detected by the PLC via the wires in the cable bundle 16 as a state change from the off state to the on state.

A coil spring 130, 132 is positioned inside each bore 68, 70, respectively, and biases the magnetic members 76, 78, respectively, forwardly within those bores 68, 70. When no pressurized gas is flowing through the path 94 (i.e., when the actuator valve 56 is closed), the magnetic members 76, 78 are in their forwardmost positions as shown in FIGS. 4 and 5. For convenience, this forwardmost position is referred to as the low pressure position. With both the members 76, 78 in their respective low pressure positions, both switches 80, 82 are in their off state because the attraction (if any) of the magnetized material in the members 76, 78 is too weak to overcome the bending resistance of the switch elements 122. Thus, the switch elements 122 will remain in their open position in spaced apart relation from their respective contacts element 120. When the actuator valve 56 is open and the shut-off valve 66 is open, a portion of the pressurized air flowing through the fluid path 94 will flow into the bores 72, 74 and force the magnetized members 76, 78 rearwardly within the bores 68, 70 against the biasing of the springs 120, 122 to positions proximate the switching elements 122. For convenience, this position is referred to as the high pressure position. With both the members in their respective high pressure position, both switches 80, 82 are in their on state because the magnetized material in the members 76, 78 attracts the ferric/magnetic switching elements 122 with sufficient force to overcome the bending resistance of the switch elements 122 and move those elements 122 to their closed positions in electroconductive engagement with the contact elements 120. When the actuator valve 56 remains open and the shut-off mechanism 92 moves the shut-off valve 66 to the closed position thereof due to the fastener reaching the predetermined level of torque, the pressure in the portion of the fluid path 94 downstream of the shut-off valve drops to normal ambient pressure and the pressure in the portion of the fluid path 94 upstream of the shut-off valve 66 remains at a high level due to the actuator valve 56 being open. As a result, the spring 132 will push member 78 forwardly to its above-described low-pressure position, thus causing switch 82 to change to its off state, and member 76 will remain proximate the switching element of switch 80 in its high pressure position, thus leaving switch 80 in its on state.

The valve control section 18 also has a signaling device 134 mounted on the exterior thereof. The signaling device 134 has three LEDs, including a red LED 136, a yellow LED 138, and a green LED 140. These LEDs are controlled by the PLC via signals sent through the cable bundle 16 and are selectively illuminated to convey to the user information concerning the status of the fastening jobs performed with the tool 14. Instead of LEDs, another other light source, such as individual incandescent bulbs, or any other suitable mechanism for visually or audibly alerting the tool user to the status of a fastening job could be used. Although they are not necessary, the use of LEDs is preferred because of their operational longevity and low power usage.

Figure 6:
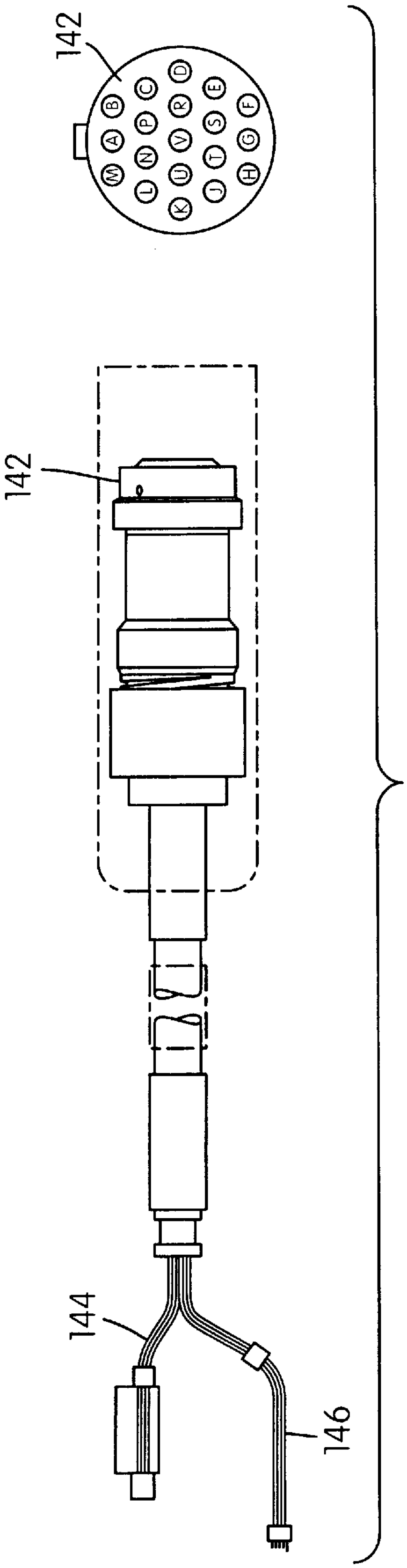
FIG. 6 is a profile view of a electric cable bundle that communicates the switches and signaling device on the tool with the processor.
Figure 7:
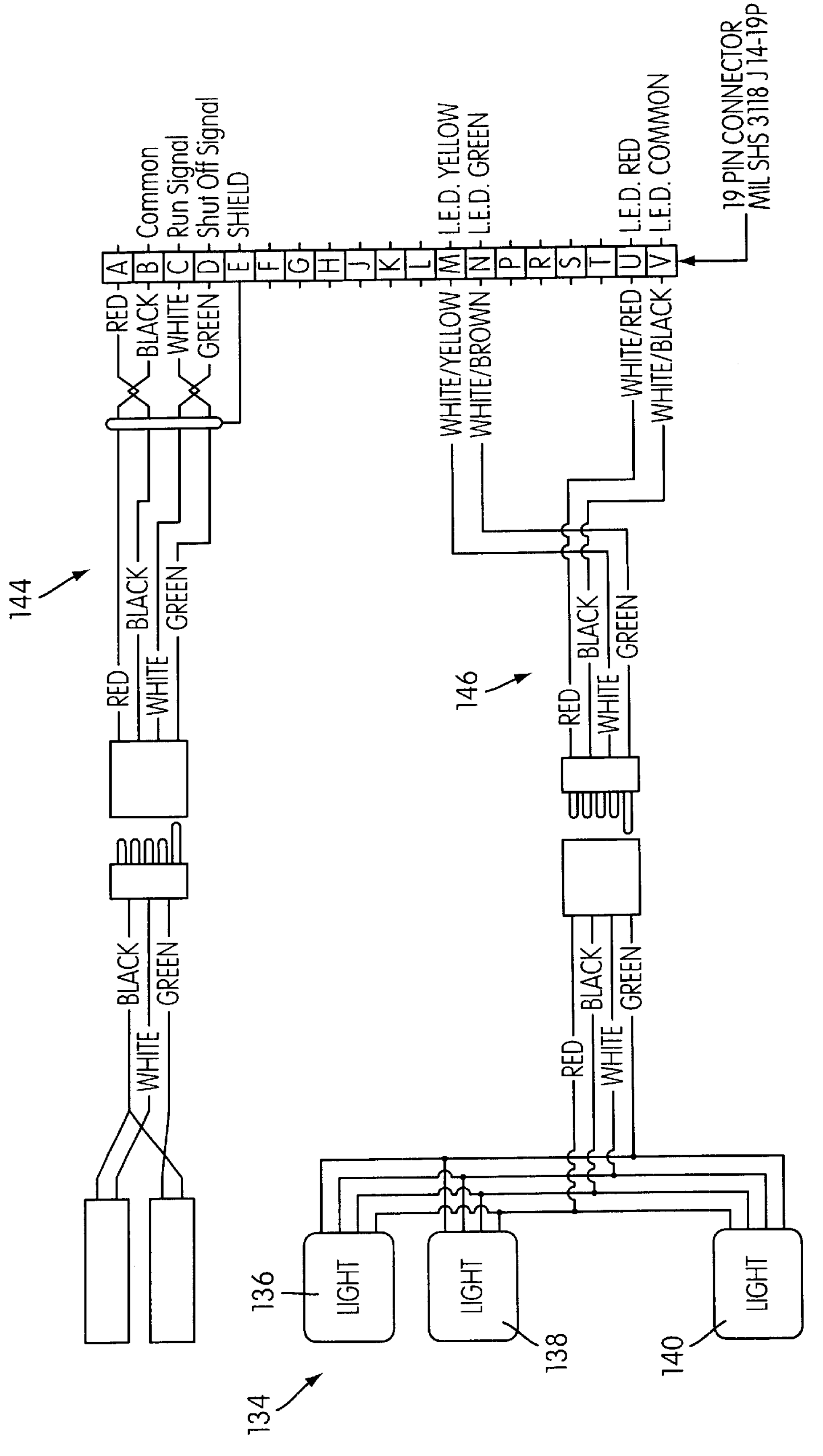
FIG. 7 is a schematic view illustrating the individual connections between the switches, the signaling device, and the processor via the electric cable bundle.

The switches 80, 82 and the user signaling device 136 are communicated to the PLC in the control box 12 by individual wires in the cable bundle 16. As seen best in FIG. 6, the cable bundle 16 has a multiple pin connector 142 at one end thereof and includes two individual groupings of the wires. The connector 142 plugs directly into an input port on the control box 12. Alternatively, the connector 142 can connect to an extension cable that runs from the control box 12. Wire group 144 communicates the switches 80, 82 with the PLC, and wire group 146 communicates the individual LEDs 136, 138, 140 of the signaling device 134 on the tool 14 with the PLC. Wire group 144 is connected to the switches 80, 82 by a pair of interconnecting pin connectors 148, 150 and wire group 146 is connected to the switches 80, 82 by a pair of interconnecting pin connectors 152, 154. The schematic layout for the connection between the switches 80, 82 and the individual wires/pins is shown in FIG. 7. The assignments for the individual wires/pins are shown in the chart in FIG. 8.

The logic used by the PLC to monitor tool performance and actuate the LEDs of the signaling device 134 is as follows.

In operation, the system 10 is designed to be used at a station on an assembly line for a motor vehicle, such as an automobile. At the station, the user's task is to tighten a predetermined number of fasteners to a predetermined level of tightness. For example, at a particular station, a vehicle may arrive at that station with a vehicle seat (not shown) mounted in the vehicle passenger compartment (not shown) with four untightened fasteners requiring tightening. The user's task would be to tighten all four fasteners to their predetermined amount of tightness to properly secure the seat in the vehicle. To accomplish this, the user uses the tool 14 to tighten each fastener. The tightening of an individual fastener is referred to as a "fastening job" and the task of tightening all four (or whatever the number may be) fasteners is referred to as a "fastening cycle."

Figure 9:
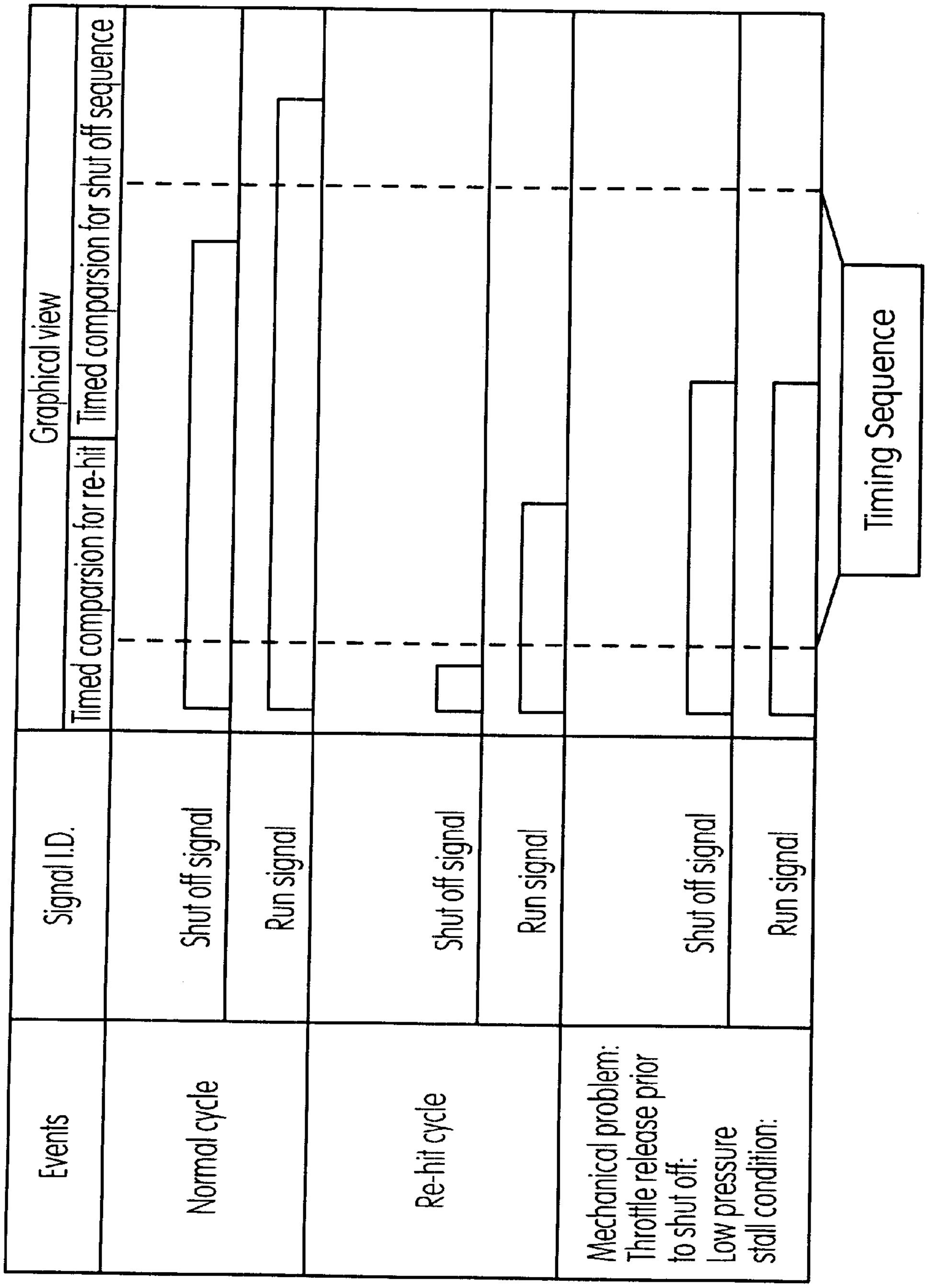
FIG. 9 is a bar graph illustrating the switch sequences that are normally detected by the processor during a fastening job.

The logic in the PLC monitors the tool 14 via the switches both to determine whether each fastening job is properly completed and to determine whether the entire fastening cycle is completed. Referring to FIG. 9, the PLC can determine whether a fastening job has been properly completed (i.e., whether the subject fastener has been tightened to the predetermined amount of torque) by monitoring the states changes of the switches 80, 82. The user initiates the fastening job by depressing the lever 30 to move the actuator valve 56 to its open position. At the initiation of the fastening job, the shut-off valve 66 will normally be in its open position. The pressurized gas from the gas supply flows through the fluid path 94 via the open valves 56, 66 to power the motor 64 for rotation of the output member 118 and the fastener engaged by the fastener engaging socket on the member 118. This pressurized gas flowing through the path moves the magnetized members 76, 78 to their high pressure positions, thereby causing both switches 80, 82 to change to the on state.

When the fastener engaged by the tool 14 reaches its predetermined level of torsional resistance, the shut-off mechanism 92 move the shut-off valve 66 to its closed position. As a result, the magnetic member 78 moves under spring bias to the low pressure position thereof, thereby causing switch 82 to change to from its on state to its off state. When the user releases the lever 30, the actuator valve 56 moves under spring bias to its closed position thereof. If the shut-off valve 66 is already closed, this will cause the magnetic member 76 to also move to the low pressure position thereof, thereby causing switch 80 to also move to the off state thereof. If the shut-off valve is still open, then this will cause both magnetic members 76, 78 to move substantially simultaneously to the low pressure positions thereof, thereby causing both switches to move substantially simultaneously to their respective off states.

If the PLC detects that switch 82 changes to the off state thereof before a set period of time has passed, then the PLC will treat that job as a "re-hit" (i.e., an attempt to tighten a fastener that has already been tightened). A suitable amount for the set period of time is around 150 ms for most applications. This is shown as the middle section in the chart of FIG. 9. If the PLC detects that switch 82 and switch 80 both change to the off state thereof substantially simultaneously, then the PLC will treat that job as being incomplete because the supply of pressurized gas ceased flowing before the shut-off mechanism 92 was actuated. This condition normally occurs as a result of the user releasing the lever 30 too early, a stall condition, or the supply of air being cut-off. This is shown as the bottom section in the chart of FIG. 9. If the PLC detects that switch 82 changes to the off state thereof (indicating that the shut-off valve 66 has moved to its closed position) after the set period of time has passed and before switch 80 has changed to the off state thereof, then the PLC will treat that job as having been properly completed with the fastener being properly tightened to the predetermined amount of torque as determined by the shut-off mechanism 92. Specifically, this switching sequence is treated as completion of the fastening job because (a) its run time exceeds the set period of time, indicating it is not a re-hit and (b) movement of the shut-off valve 66 to its closed position before movement of the actuator valve 56 to its closed position indicates that the predetermined level of fastener resistance was reached and tripped the shut-off mechanism 92. This is shown as the top section in the chart of FIG. 9.

At the beginning of the fastening cycle, the yellow LED 138 is illuminated to indicate a ready condition. For each fastening job initiated, if the PLC determines that the job has been properly completed, then it signals the yellow LED 138 to flash three to five times to indicate proper job completion to the user. The PLC also registers or counts the job as a completed job for that cycle. If the PLC determines that the job is a re-hit, then no signal is emitted and the job is not registered or counted as a completed job for that cycle. If the PLC determines that the job is incomplete, then no signal is emitted and the job is not registered or counted as a completed job for that cycle. However, if the user re-engages the fastener and completes that uncompleted job, then that job will be counted or registered as a completed job for that fastening cycle. Upon the PLC determining that the predetermined number of jobs (four for the vehicle seat example mentioned above) for that cycle have been completed, then the PLC will signal to green LED 140 to be illuminated until the next part arrives at the station. Shortly before the vehicle leaves the station without all the jobs in the cycle being completed, the PLC will signal the red LED 136 to be illuminated for user feedback and also will transmit that occurrence to a centralized quality control monitoring system so that the full cycle can be completed after the vehicle has left the assembly line. Alternatively, the quality control monitoring system can cause temporary halting of the assembly line so that the user has an opportunity to complete the fastening cycle. This information stored in the quality control system can also be used to track worker performance. Once the part leaves the station, the counter/register in the PLC is reset back to zero and the yellow LED 138 is illuminated to a steady state indicating readiness for initiation of another cycle.

Any sequence of lights or signaling arrangement may be used. The example described above is provided only for illustrative purposes and is not intended to be limiting.

Figure 10:
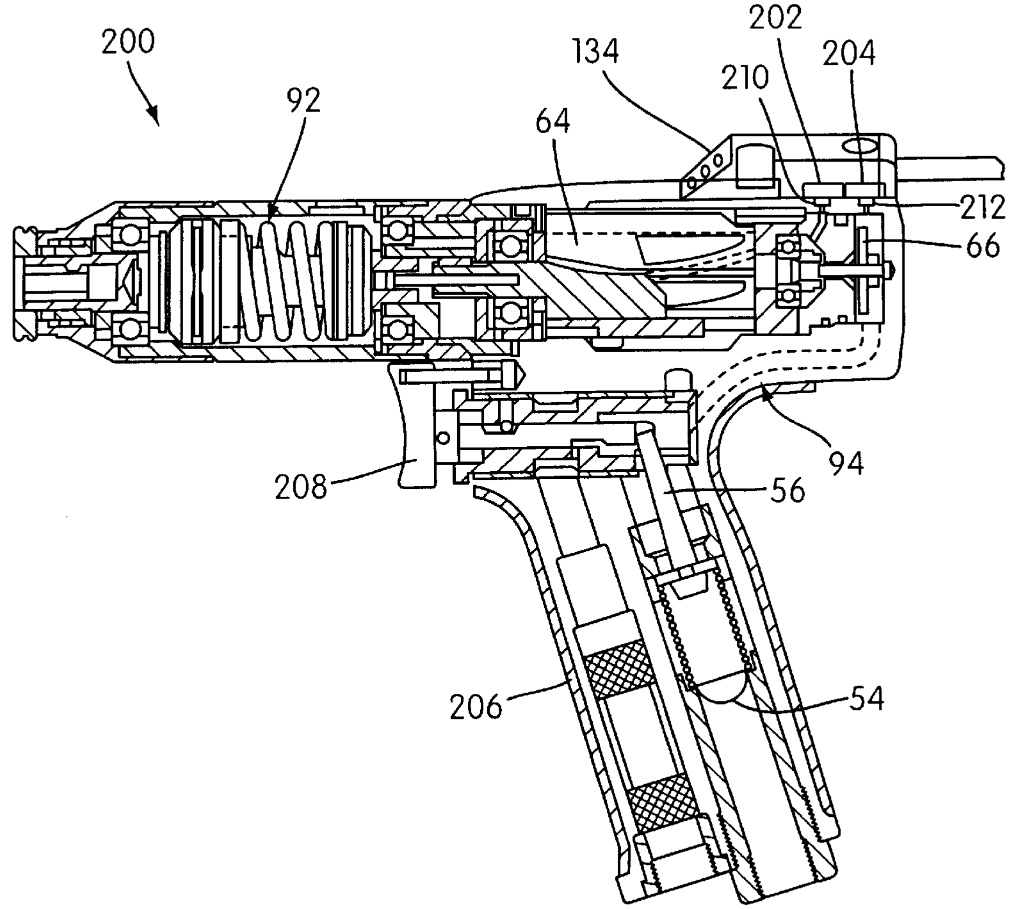
FIG. 10 is a cross-sectional view of another type of tool with which the principles of the present invention may be practiced.

FIG. 10 illustrates a pistol-type tool 200 constructed in accordance with the principles of the present invention. Although it has a different external appearance and internal construction, the pistol-type tool 200 is similar in function and appearance to the tool 14 of the previous embodiment. Thus, the same reference numerals will be used to denote corresponding elements. One significant difference worth noting is that the pistol configuration has a hand grip portion 206 and a trigger 208 is used to move the actuator valve 56 between the open and closed positions thereof. Another difference worth noting in the tool 200 of FIG. 12 is the type of switches that are used in the tool 14 for pressure sensing. Instead of magnetically actuated reed switches, a pair of pressure-sensitive tactile switches 202, 204 are used. Switch 202 is communicated to the portion of the fluid path 94 between the shut-off valve 66 and the motor 64 by passageway 210. Switch 204 is communicated to the portion of the fluid path 94 between the shut-off valve 66 and the actuator valve 56 by passageway 212.

Figure 11:
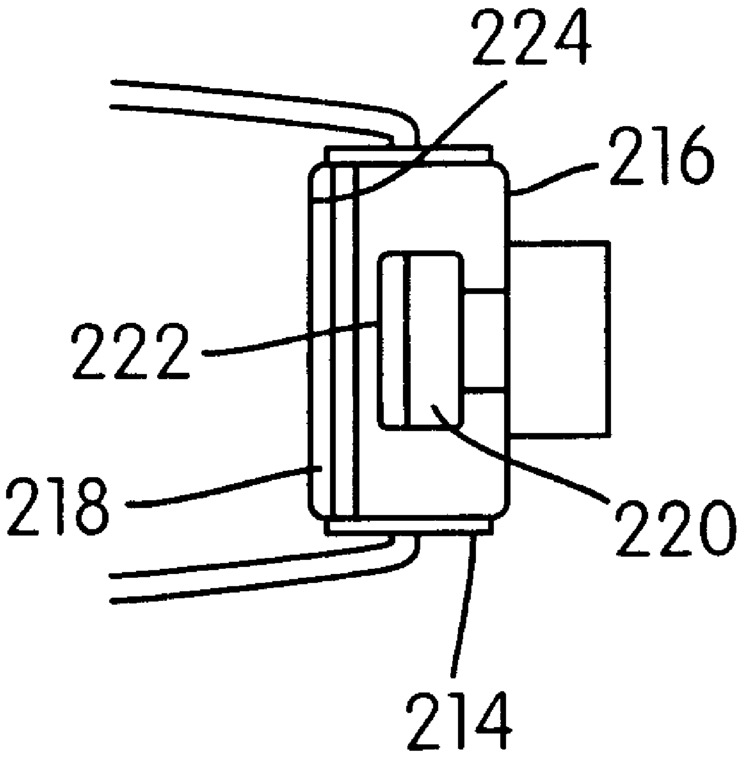
FIG. 11 is a cross-sectional view of a switch used in the tool of FIG. 10.

FIG. 11 shows a cross-section of pressure-sensitive tactile switch 202. Switch 204 has an identical construction. The switch has a fluidly sealed outer casing structure 214 comprising a rigid cup-shaped member 216 and a resilient, impermeable rubber membrane 218 mounted in sealed covering relation over the open end of the member 214. This prevents lubricant in the tool 200 from entering into the casing structure 214 and interfering with the operation of the switch 202. A contact support 220 is mounted within the cup-shaped member 214. A contact element 222 is secured by adhesive to the contact support 220. A switching element 224 is secured by adhesive to the interior surface of the membrane 218. The contact element 222 is communicated to the PLC by a lead communicated to an individual wire in the cable bundle 16. The switching element 224 is also communicated to the PLC by another lead and another individual wire in the cable bundle 16. When the switching element 224 contacts the contact element 222, a closed circuit is created and the switch 202 is in its on state. The closed condition of the circuit is detected by the PLC via the wires in the cable bundle 16 as a state change from the off state to the on state. When the switching element 224 is spaced out of contact with the contact element 222, that circuit is open and the switch is in its off state. The open condition of the circuit is detected by the PLC via the wires in the cable bundle 16 as a state change from the on state to the off state. The switching element 224 is moved into contact by the pressure of pressurized air on the exterior surface of the membrane 218. That, when pressurized air is flowing through the portion of the path 94 to which the relevant switch is communicated, the pressurized air will force the membrane 218 inwardly to close the circuit and place the switch in its on state. Conversely, when no pressurized air is flowing in that portion of the path 94, the membrane 218 resiliently returns to its original condition with the elements 222, 224 out of contact to put the switch in the off state. The PLC logic for monitoring performance of the fastening cycle and the fastening jobs is carried out as in the previous embodiment.

The foregoing illustrated embodiment has been provided to illustrate the structural and functional principles of the present invention and is not intended to be limiting. To the contrary, the principles of the present invention are intended to encompass any and all changes, alterations and/or substitutions within the spirit and scope of the following claims.

What is claimed:

1. A system for applying torque to fasteners, said system comprising:

(i) a pneumatically drivable tool comprising:

a housing having a fluid path provided therein, said fluid path having an inlet end connectable to a supply of pressurized gas and being constructed and arranged to enable pressurized gas from the supply thereof to flow therethrough and exhaust from an outlet end thereof from said housing;

a rotatable fastener engaging member constructed and arranged to be engaged with a fastener in a torque transmitting relation wherein rotation of said fastener engaging member applies torque to said fastener to affect rotation of said fastener;

a pneumatically drivable motor positioned within said fluid path between said inlet and outlet ends, said motor being constructed and arranged such that said pressurized gas flowing through said fluid path flows through said motor to generate rotational power, said motor being operatively connected to said fastener engaging member such that said motor rotates said fastener engaging member using the rotational power generated by the pressurized gas flowing therethrough;

an actuator valve positioned within said fluid path between said inlet end and said motor, said actuator valve being movable between an open position enabling the pressurized gas to flow through said path and a closed position preventing the pressurized gas from flowing through said path;

an actuator constructed and arranged to be manually operated by a user of said tool, said actuator being connected to said actuator valve such that operation thereof by the user moves said actuator valve between said closed and open positions thereof;

a shut-off valve positioned within said fluid path between said actuator valve and said motor, said shut-off valve being movable between an open position enabling the pressurized gas to flow through said path and a closed position preventing the pressurized gas from flowing through said path;

a shut-off mechanism coupled to said shut-off valve, said shut-off mechanism being constructed and arranged to provide for movement of said shut-off valve from said open position thereof to said closed position thereof responsive to the torsional resistance being offered by a fastener during rotation thereof reaching a predetermined level;

a first switch having a plurality of states, said first switch being adapted to change from a first of said states to a second of said states responsive to the pressurized gas flowing into a portion of said fluid path between said shut-off and actuator valves as a result of said actuator valve being in said open position thereof;

a second switch having a plurality of states, said second switch being adapted to change from a first of said states to a second of said states responsive to the pressurized gas flowing into a portion of said fluid path between said shut-off valve and said motor as a result of both said shut-off and actuator valves being in said open positions thereof;

fluidly sealed casing structure encasing said first and second switches to protect said switches from any lubricant present within said housing;

(ii) a processor communicated with said first and second switches, said processor being operable to monitor the state changes of said first and second switches during the performance of a fastening job and to compare said state changes to pre-selected parameters to determine a status of the fastening job.

2. A pneumatically drivable tool for applying torque to fasteners in conjunction with (i) a processor that monitor the state changes of first and second switches on said tool during the performance of a fastening job and to compare said state changes to pre-selected parameters to determine a status of the fastening job and (ii) a supply of pressurized gas; said tool comprising:

a housing having a fluid path provided therein, said fluid path having an inlet end connectable to a supply of pressurized gas and being constructed and arranged to enable pressurized gas from the supply thereof to flow therethrough and exhaust from an outlet end thereof from said housing;

a rotatable fastener engaging member constructed and arranged to be engaged with a fastener in a torque transmitting relation wherein rotation of said fastener engaging member applies torque to said fastener to affect rotation of said fastener;

a pneumatically drivable motor positioned within said fluid path between said inlet and outlet ends, said motor being constructed and arranged such that said pressurized gas flowing through said fluid path flows through said motor to generate rotational power, said motor being operatively connected to said fastener engaging member such that said motor rotates said fastener engaging member using the rotational power generated by the pressurized gas flowing therethrough;

an actuator valve positioned within said fluid path between said inlet end and said motor, said actuator valve being movable between an open position enabling the pressurized gas to flow through said path and a closed position preventing the pressurized gas from flowing through said path;

an actuator constructed and arranged to be manually operated by a user of said tool, said actuator being connected to said actuator valve such that operation thereof by the user moves said actuator valve between said closed and open positions thereof;

a shut-off valve positioned within said fluid path between said actuator valve and said motor, said shut-off valve being movable between an open position enabling the pressurized gas to flow through said path and a closed position preventing the pressurized gas from flowing through said path;

a shut-off mechanism coupled to said shut-off valve, said shut-off mechanism being constructed and arranged to provide for movement of said shut-off valve from said open position thereof to said closed position thereof responsive to the torsional resistance being offered by a fastener during rotation thereof reaching a predetermined level;

a first switch having a plurality of states and being adapted to be communicated with said processor to enable said processor to monitor states changes of said first switch, said first switch being adapted to change from a first of said states to a second of said states responsive to the pressurized gas flowing into a portion of said fluid path between said shut-off and actuator valves as a result of said actuator valve being in said open position thereof;

a second switch having a plurality of states and being adapted to be communicated with said processor to enable said processor to monitor states changes of said second switch, said second switch being adapted to change from a first of said states to a second of said states responsive to the pressurized gas flowing into a portion of said fluid path between said shut-off valve and said motor as a result of both said shut-off and actuator valves being in said open positions thereof;

fluidly sealed casing structure encasing said first and second switches to protect said switches from any lubricant present within said housing.

3. A system for applying torque to fasteners, said system comprising:

(i) a pneumatically drivable tool comprising:

a housing having a fluid path provided therein, said fluid path having an inlet end connectable to a supply of pressurized gas and being constructed and arranged to enable the pressurized gas from the supply thereof to flow therethrough and exhaust from an outlet end thereof from said housing;

a rotatable fastener engaging member constructed and arranged to be engaged with a fastener in a torque transmitting relation wherein rotation of said fastener engaging member applies torque to said fastener to affect rotation of said fastener;

a pneumatically drivable motor positioned within said fluid path between said inlet and outlet ends, said motor being constructed and arranged such that said pressurized gas flowing through said fluid path flows through said motor to generate rotational power, said motor being operatively connected to said fastener engaging member such that said motor rotates said fastener engaging member using the rotational power generated by the pressurized gas flowing therethrough;

an actuator valve positioned within said fluid path between said inlet end and said motor, said actuator valve being movable between an open position enabling the pressurized gas to flow through said path and a closed position preventing the pressurized gas from flowing through said path;

an actuator constructed and arranged to be manually operated by a user of said tool, said actuator being connected to said actuator valve such that operation thereof by the user moves said actuator valve between said closed and open positions thereof;

a shut-off valve positioned within said fluid path between said actuator valve and said motor, said shut-off valve being movable between an open position enabling the pressurized gas to flow through said path and a closed position preventing the pressurized gas from flowing through said path;

a shut-off mechanism coupled to said shut-off valve, said shut-off mechanism being constructed and arranged to provide for movement of said shut-off valve from said open position thereof to said closed position thereof responsive to the torsional resistance being offered by a fastener during rotation thereof reaching a predetermined level;

a first switch having a plurality of states, said first switch being adapted to change from a first of said states to a second of said states responsive to the pressurized gas flowing into a portion of said fluid path between said shut-off and actuator valves as a result of said actuator valve being in said open position thereof;

a second switch having a plurality of states, said second switch being adapted to change from a first of said states to a second of said states responsive to the pressurized gas flowing into a portion of said fluid path between said shut-off valve and said motor as a result of both said shut-off and actuator valves being in said open positions thereof;

an on-board signaling device carried on said housing, said signaling device being adapted to generate a user verifiable fastening job signal to be received by the user of said tool that indicates a status of a fastening job;

(ii) a processor communicated with said on-board signaling device and said first and second switches, said processor being operable to monitor the state changes of said first and second switches during the performance of a fastening job and to compare said state changes to pre-selected parameters to determine whether the user has performed the fastening job in accordance with said parameters, said processor being operable to cause said signaling device to generate said fastening job signal based on the comparison of said state changes with said parameters.

4. A pneumatically drivable tool for applying torque to fasteners in conjunction with (i) a processor that monitor the state changes of first and second switches on said tool during the performance of a fastening job and to compare said state changes to pre-selected parameters to determine whether the user has performed the fastening job in accordance with said parameters, said processor being operable to generate and transmit a signal based on the comparison of said state changes with said parameters and (ii) a supply of pressurized gas; said tool comprising:

a housing having a fluid path provided therein, said fluid path having an inlet end connectable to a supply of pressurized gas and being constructed and arranged to enable pressurized gas from the supply thereof to flow therethrough and exhaust from an outlet end thereof from said housing;

a rotatable fastener engaging member constructed and arranged to be engaged with a fastener in a torque transmitting relation wherein rotation of said fastener engaging member applies torque to said fastener to affect rotation of said fastener;

a pneumatically drivable motor positioned within said fluid path between said inlet and outlet ends, said motor being constructed and arranged such that said pressurized gas flowing through said fluid path flows through said motor to generate rotational power, said motor being operatively connected to said fastener engaging member such that said motor rotates said fastener engaging member using the rotational power generated by the pressurized gas flowing therethrough;

an actuator valve positioned within said fluid path between said inlet port and said motor, said actuator valve being movable between an open position enabling the pressurized gas to flow through said path and a closed position preventing the pressurized gas from flowing through said path;

an actuator constructed and arranged to be manually operated by a user of said tool, said actuator being connected to said actuator valve such that operation thereof by the user moves said actuator valve between said closed and open positions thereof;

a shut-off valve positioned within said fluid path between said actuator valve and said motor, said shut-off valve being movable between an open position enabling the pressurized gas to flow through said path and a closed position preventing the pressurized gas from flowing through said path;

a shut-off mechanism coupled to said shut-off valve, said shut-off mechanism being constructed and arranged to provide for movement of said shut-off valve from said open position thereof to said closed position thereof responsive to the torsional resistance being offered by a fastener during rotation thereof reaching a predetermined level;

a first switch having a plurality of states and being adapted to be communicated with said processor to enable said processor to monitor states changes of said first switch, said first switch being adapted to change from a first of said states to a second of said states responsive to the pressurized gas flowing into a portion of said fluid path between said shut-off and actuator valves as a result of said actuator valve being in said open position thereof;

a second switch having a plurality of states and being adapted to be communicated with said processor to enable said processor to monitor states changes of said second switch, said second switch being adapted to change from a first of said states to a second of said states responsive to the pressurized gas flowing into a portion of said fluid path between said shut-off valve and said motor as a result of both said shut-off and actuator valves being in said open positions thereof;

an on-board signaling device carried on said housing and adapted to be communicated with said processor, said signaling device being adapted to generate a user verifiable fastening job signal to be received by the user of said tool that indicates a status of a fastening job responsive to receiving the aforesaid signal from said processor.

* * * * *